F. C. STRUKE.
NUTLESS AXLE AND HUB MOUNTING.
APPLICATION FILED FEB. 6, 1914.
1,182,813.
Patented May 9, 1916.
2 SHEETS—SHEET 1.
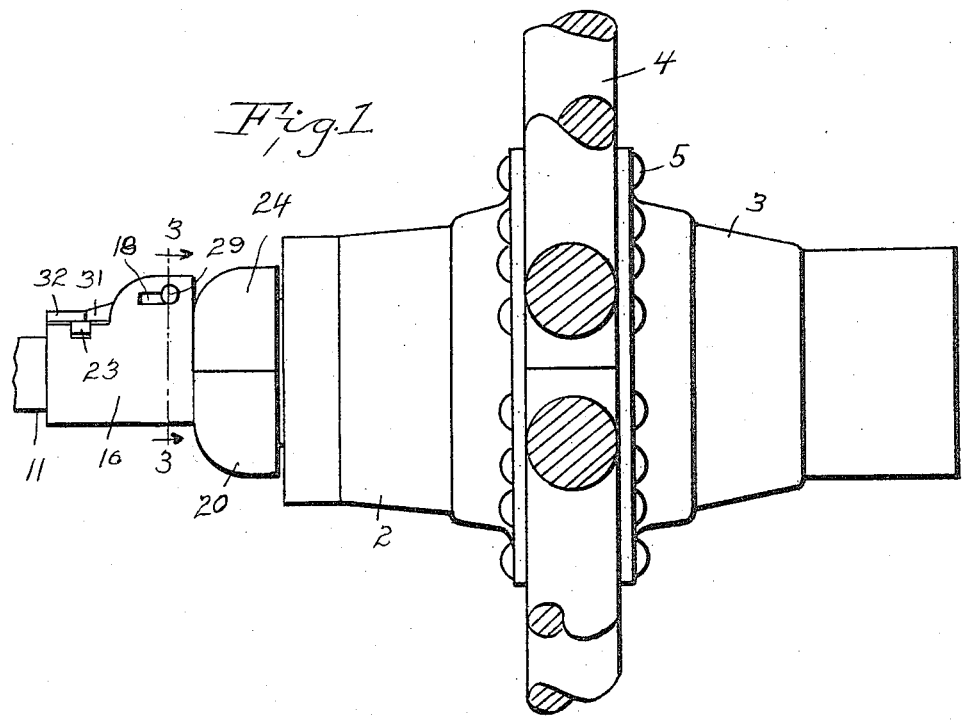
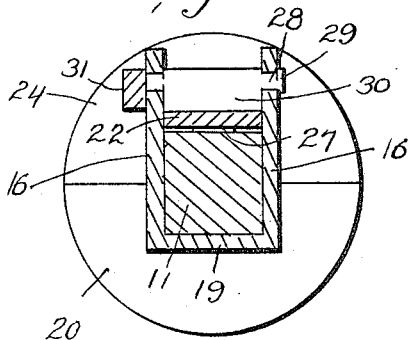
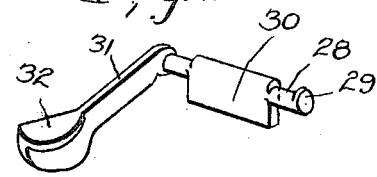
Witnesses
Inventor
F. C. Struke.

F. C. STRUKE.
NUTLESS AXLE AND HUB MOUNTING.
APPLICATION FILED FEB. 6, 1914.
1,182,813.
Patented May 9, 1916.
2 SHEETS—SHEET 2.
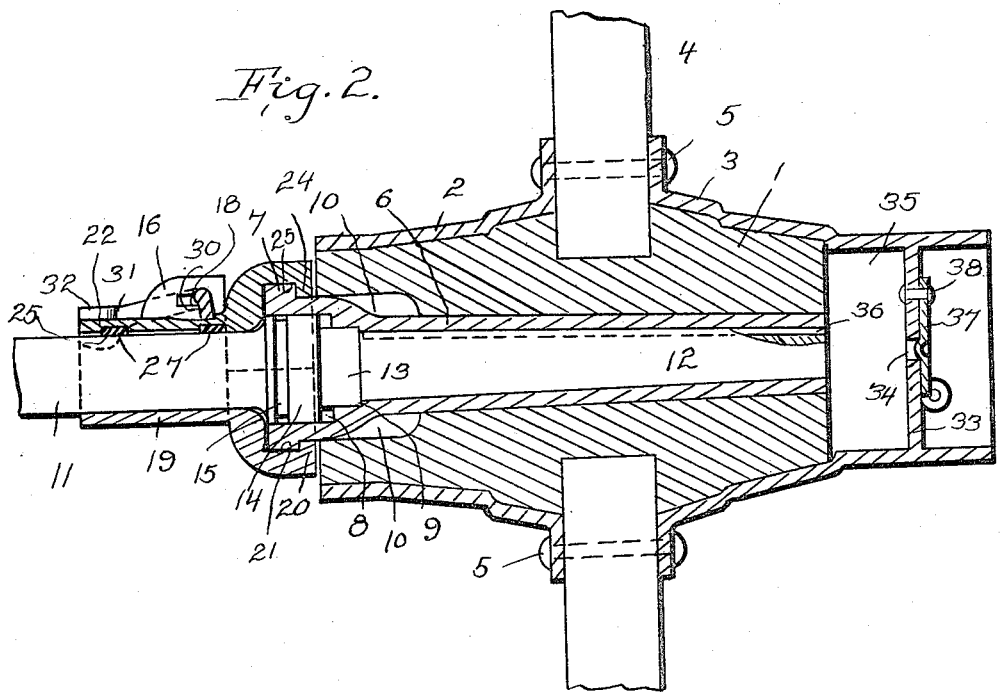
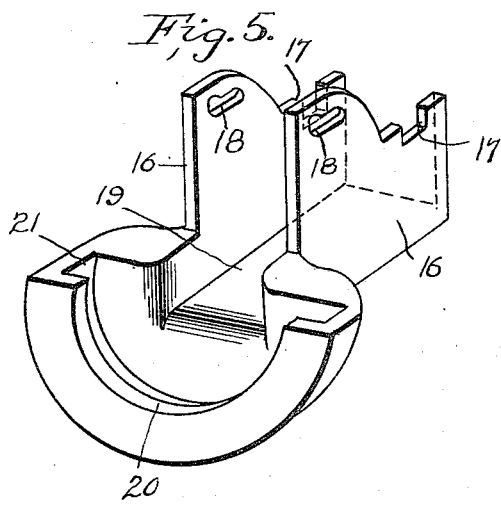
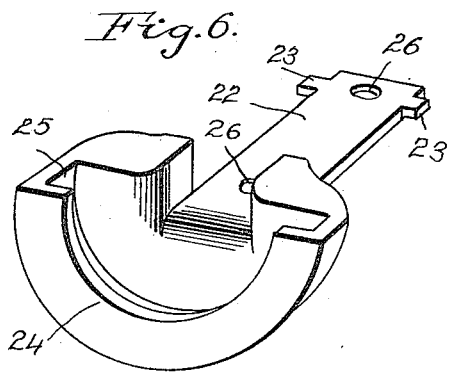
Witnesses
Inventor
F. C. Struke.
Attorney

UNITED STATES PATENT OFFICE.

FREDERICK C. STRUKE, OF CHICAGO HEIGHTS, ILLINOIS.

NUTLESS AXLE AND HUB-MOUNTING.

1,182,813.   Specification of Letters Patent.   Patented May 9, 1916.

Application filed February 6, 1914. Serial No. 816,996.

*To all whom it may concern:*

Be it known that I, FREDERICK C. STRUKE, a citizen of the United States, residing at Chicago Heights, in the county of Cook and State of Illinois, have invented certain new and useful Improvements in Nutless Axles and Hub-Mountings; and I do hereby declare the following to be a full, clear, and exact description of the invention, such as will enable others skilled in the art to which it appertains to make and use the same.

This invention relates to nutless axles and hub mountings, and one of the principal objects of the invention is to provide means of simple construction to mount a hub upon an axle spindle without the use of nuts, and without the necessity of screw threading the parts.

Another object of the invention is to provide reliable and efficient means for mounting a hub upon an axle spindle without the use of threaded nuts, and to provide means for lubricating the axle spindle.

Another object of the invention is to provide means for attaching a hub to an axle which will be inexpensive to manufacture, which can be easily assembled, and in which the parts will be ready for use when they come from the foundry without requiring machine work.

These and other objects may be attained by means of the construction illustrated in the accompanying drawings, in which, Figure 1 is a side elevation of a hub and attaching means made in accordance with this invention, the spokes of the wheel being shown broken away, Fig. 2 is a longitudinal section through the same, Fig. 3 is a detail sectional view taken on the line 3—3 of Fig. 1 looking in the direction indicated by the arrows, Fig. 4 is a detail perspective view of the detachable cam lever for holding the two parts of the hub attaching device, Fig. 5 is a detail perspective view of one member of the hub attaching device, and Fig. 6 is a similar view of the other member thereof.

Referring to the drawings, the numeral 1 designates the hub provided with the metal ends and face plates 2—3, and 4 are the spokes fitted in sockets in the hub and secured in place by means of bolts or rivets 5.

Fitted in the hub 1 is a tapering skein or bushing 6, provided at its inner end with an annular flange 7, and with interior annular shoulders 8 and 9. The skein is held in the hub by means of the integral wedges 10, and the outer end of the skein terminates at the outer end of the wooden hub 1.

The squared axle 11 is provided with a tapering spindle 12 which fits within the bushing or skein 6, and is provided with an enlarged portion 13 which fits against the shoulder 9 and an enlarged annular portion 14 provided with a groove 15.

The hub attaching device comprises two members, one of which is provided with side members 16 having angular recesses 17 at their upper edges and oppositely disposed key-hole slots 18. The side members are formed integral with the base or plate 19, and projecting therefrom is an annular inwardly projecting flange 20, adjacent to which is an annular recess 21 designed to fit over the annular flange 7 on the bushing 6. This member of the hub attaching device is seated underneath the axle with the two side members 16 disposed upon opposite sides of the axle, as shown in Fig. 3, with the annular flange 7 seated in the semi-annular groove 21. The top plate or member consists of an extension 22 having oppositely disposed lugs 23 to fit in the angular recesses 17, and formed integral with the extension 22 is a semi-annular inwardly projecting flange 24 having an adjacent annular groove 25 to fit the upper portion of the annular flange 7.

On the inner side of the extension 22, sockets 26 are formed to receive rubber cushions or bumpers 27 which bear against the upper surface of the axle and assist in holding the key about to be described in place.

A key comprising a pintle 28 having its outer end 29 enlarged, and having a cam projection 30 thereon, is provided with a handle 31 to operate the same, said handle having a concave enlarged end 32. After the member 22 is placed in position on the top of the axle, the key is inserted in the key-hole slot 18 and when the handle 31 is turned down the cam projection 30 bears upon the top of the plate 22 to hold the members together with the rubber cushions 27 serving to prevent displacement of the key.

At the outer end of the hub a partition 33 is formed in the projecting member 3, and formed centrally in said partition 33 is an aperture 34 through which oil may be deposited in the oil receptacle 35. The spindle 12 is provided with a longitudinal groove 36 to carry the oil into the bearings. A shutter 37 is pivoted at 38 to the partition to cover the aperture 34.

From the foregoing it will be obvious that an axle and hub mounting made in accordance with this invention, entirely eliminates the use of threaded nuts or other threaded connections, and it will also be apparent that by removing the key and separating the members of the hub attaching device, the wheel may be readily withdrawn from the spindle, and can quickly be assembled whenever desired.

The invention is simple in construction, can be produced at low cost, and is a great saving in labor since it eliminates the screw threading of parts.

Various changes may be made in the details of construction without departing from the spirit and scope of the invention as defined in the claim.

What is claimed is:—

In combination, a hub, a bushing fitted in said hub and having an annular flange disposed adjacent the inner side of said hub, an axle having a spindle projecting into said bushing, means for holding said bushing upon said axle, said holding means including a base plate engaged under said axle, spaced side members formed upon said base plate and extending upwardly upon opposite sides and above said axle and having recesses in the upper edges thereof, a top plate movably positioned between said side members and engaged with the top of said axle, laterally projecting lugs formed on said top plate engaged in said recesses to secure the top and base plates against relative longitudinal movement, semi-circular internally grooved flanges carried by the top and base plates receiving said annular flange to secure said bushing against axial movement with relation to said plates, a key pivotally mounted in the upper portions of said side members, and a cam carried by said key adapted to engage said top plate to clamp the latter together with the base plate upon said axle.

In testimony whereof I affix my signature in presence of two witnesses.

FREDERICK C. STRUKE.

Witnesses:
 WILLIAM L. SCHULTZ,
 ADOLPH STRUKE, Jr.

Copies of this patent may be obtained for five cents each, by addressing the "Commissioner of Patents, Washington, D. C."